United States Patent [19]
Chattin

[11] 3,886,927
[45] June 3, 1975

[54] STONE CUTTER

[76] Inventor: John Henry Chattin, 10603 Crocus St., Orlando, Fla. 32807

[22] Filed: Feb. 25, 1974

[21] Appl. No.: 445,764

[52] U.S. Cl. ............................................. 125/23 C
[51] Int. Cl. .............................................. B28d 1/32
[58] Field of Search ....................................... 125/23

[56] References Cited
UNITED STATES PATENTS

| | | | |
|---|---|---|---|
| 600,856 | 3/1898 | Brinkman............................ | 125/23 C |
| 812,973 | 2/1906 | Barr..................................... | 125/23 C |
| 2,874,688 | 2/1959 | Biesanz................................ | 125/23 C |

FOREIGN PATENTS OR APPLICATIONS

| | | | |
|---|---|---|---|
| 195,314 | 1/1958 | Austria................................ | 125/23 R |
| 122,714 | 2/1919 | United Kingdom................ | 125/23 R |
| 830,473 | 2/1952 | Germany............................ | 125/23 C |

Primary Examiner—Harold D. Whitehead
Attorney, Agent, or Firm—Hall & Myers

[57] ABSTRACT

A device for accurately cutting hard or soft stone which comprises a stationary lower blade having aligned therewith in the vertical plane an upper movable blade, each of said blades having a 90° angle cutting edge, each edge being aligned with the other in substantially the same vertical plane, aligning supports on each side of the blades which pivotally retain a handle mechanism having thereon an anvil connected to the upper movable blade such that when a stone is placed between the two blades and said handle is pivoted about its pivotal point so as to tightly secure the stone between the two blades, a blow from a hand held hammer upon the anvil will drive the upper movable blade toward the lower blade, accurately cutting a stone or either hard or soft composition.

4 Claims, 5 Drawing Figures

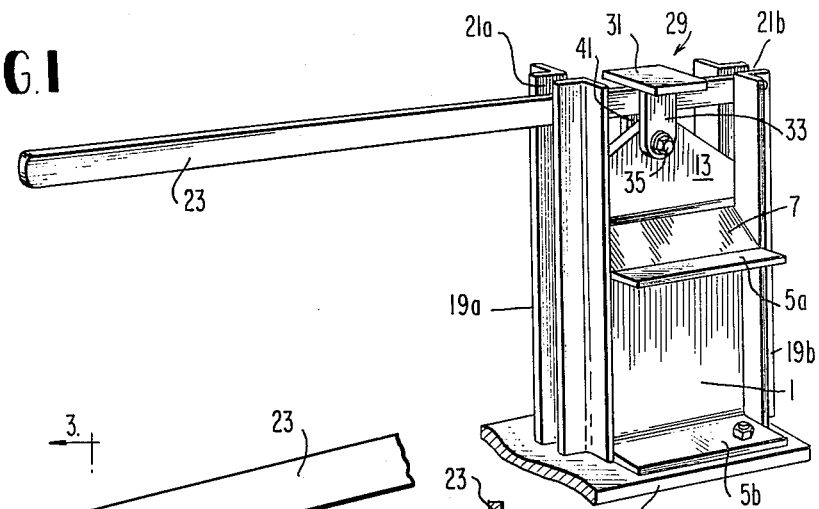
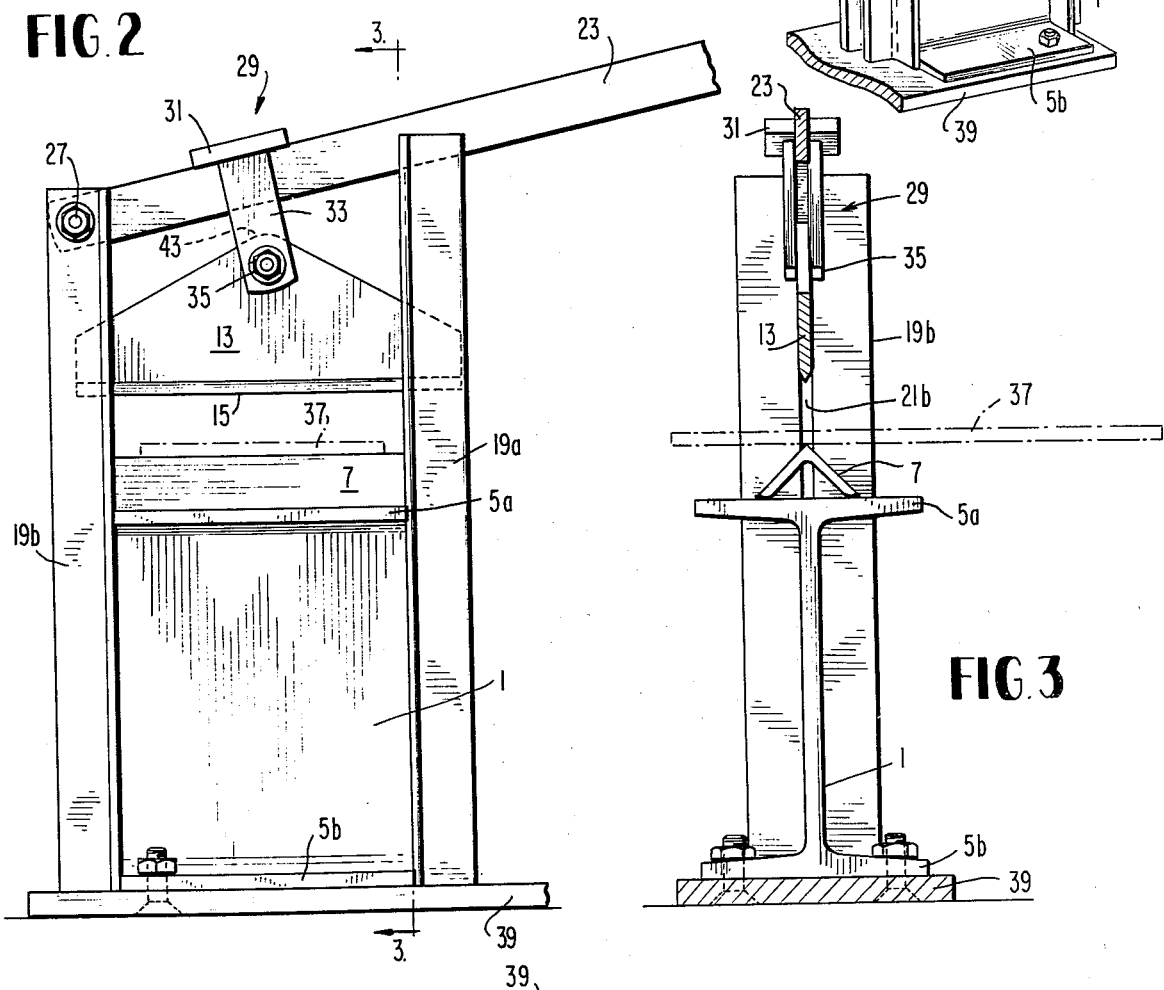
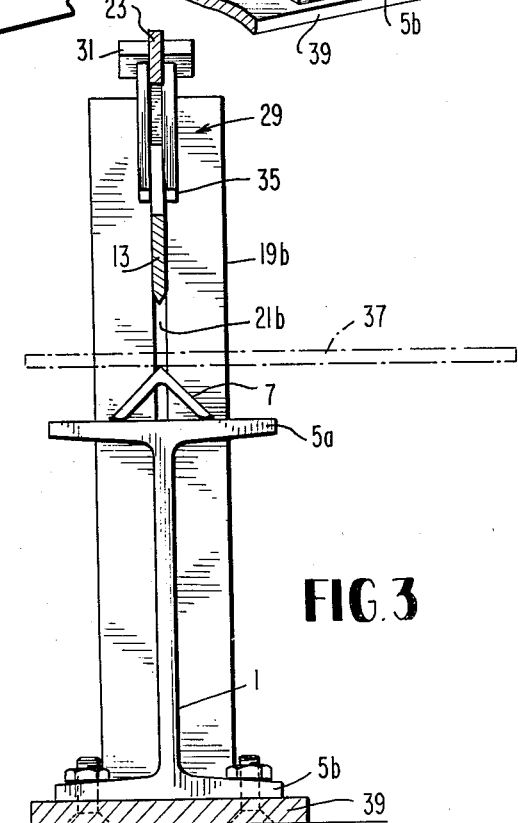
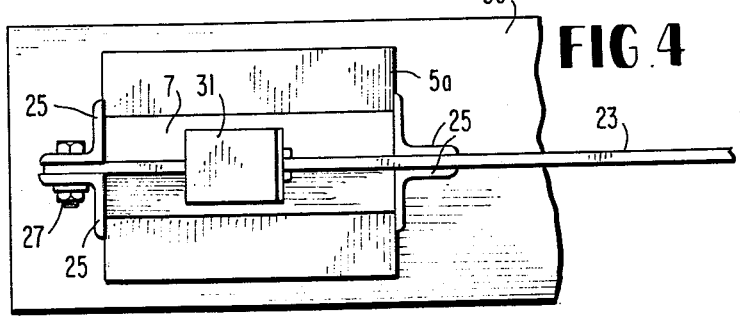
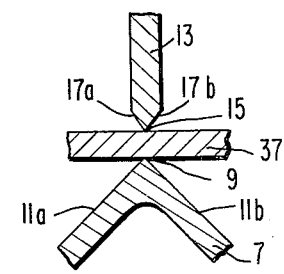

STONE CUTTER

This application relates to stone cutting devices. More particularly this application relates to stone cutting devices which may be employed for accurately cutting either hard or soft stone, and which are particularly useful for accurately cutting window sills made out of hard stone such as marble and the like.

Many devices for cutting stone have been devised in the art. Generally speaking, and as is recognized in the art, most of these devices are extremely complex in nature, expensive to manufacture, employ complex spring mechanisms, hydraulic systems, and the like and yet with all of their complexity still do not accurately cut stones, particularly of a hard composition such as marble.

In recent years, with the increase in the use of hard stone particularly in the building industry, several attempts have been made to simplify these complex devices through the use of various guillotine techniques. Generally speaking, some success has been achieved in simplification, but in doing so, accuracy has usually been sacrificed. In addition, in rendering the systems less complex, in several instances they have been rendered incapable of cutting hard stone such as marble, granite and the like, and are thus restricted to cutting softer masonry block such as brick, sand or cinder block, and the like. In addition, simplification has only been a relative situation since in many instances the devices are still unusually complex, require complex spring mechanisms, pressure mechanisms, and hydraulic rams or the like.

Exemplary of the above-described prior art, and the difficulties therein, are the following United States Patents Nos:

| | |
|---|---|
| 1,599,519 | 3,161,190 |
| 2,582,694 | 3,297,015 |
| 3,026,865 | 3,677,258 |

The need for a simple, careable device which can accurately cut stone and particularly hard stone such as marble, is acutely felt in the home building industry wherein a characteristic architectural technique for building windows is to provide a window sill of cut marble (either synthetic or natural). Such stone is extremely hard and has heretofore been very difficult to cut accurately. In fact, in many instances cutting must take place as a separate operation in a factory or quarry using complex equipment rather than being able to adopt the stone precisely to the window sill frame on location. It would, of course, be extremely desirable to have a portable stone cutting unit which is capable of accurately cutting such marble stone "on the job" rather than by way of a separate complex operation.

It is a purpose of this invention to fulfill the above-described needs in the art as well as other needs which will become more apparent to those skilled in the art once given the following detailed description of the invention, wherein:

IN THE DRAWINGS

FIG. 1 is a three-dimensional perspective view of an embodiment of this invention;

FIG. 2 is a side plane view of the embodiment of FIG. 1;

FIG. 3 is a side plane, partially sectionalized view, taken along sectional line 3,3 of FIG. 2;

FIG. 4 is a top plane view of the embodiment of FIG. 1; and

FIG. 5 is a side sectional view illustrating the alignment of the upper and lower blade means having therebetween a piece of stone for cutting.

Referring to the stone cutting device illustrated in the accompanying drawings, ther is provided a supporting member 3 and opposing horizontal flanges 5a and 5b. In normal operation, flange 5b is the ground contacting support for the stone cutter (or it may be attached to foot retaining means 39 as described hereinafter) while flange 5a supports lower stationary cutting blade 7.

As best illustrated in FIG. 5, lower stationary cutting blade 7 includes a cutting edge 9 defined by two intersecting surfaces 11a and 11b. In substantially the same vertical plane with lower stationary blade 7 and its cutting edge 9 is upper movable cutting blade 13. Upper movable cutting blade 13 is in a like manner to blade 7 comprised of a cutting edge 15 defined by intersecting surfaces 17a and 17b.

It has been found, as a part of this invention, that one of the difficulties experienced in the prior art is that in many instances offset chisel blades (e.g., wherein only one intersecting edge of the blade was bevelled) were being employed in an attempt to cut or shear the stone. It has been found that in the subject invention, such leads to inaccuracies in the preciseness of the cut, and also, at times, may render the device incapable of cutting stone of very hard composition.

Thus, in the preferred embodiments of this invention, two characteristics of the blades are employed for accurate cutting, particularly of hard stone. The first characteristic is that cutting edge 9 should lie within substantially the same plane as cutting edge 15. In the drawings, these cutting edges are shown as lying in substantially the same vertical plane. The second characteristic is that the intersecting surfaces 11a and 11b for blade 7 and intersecting surfaces 17a and 17b for blade 13 should be angled from both the horizontal and vertical so as to form a "knife edge" blade. That is to say, each of intersecting surfaces 11a and 11b, and 17a and 17b should be formed at an angle from the vertical plane (i.e., the common aligning plane of cutting edges 9 and 15) at an angle less than 90° but greater than 0°. It has been found that in the more preferred embodiments of this invention, and particularly when cutting marble slabs of approximately one inch in thickness, that an angle of approximately 45° (i.e., thus the intersecting full angle of the knife edges is 90°) gives outstanding results in regard to cutting accuracy, neatness and precision.

In view of the above discussion with respect to the need for alignment of the blades, there is provided in the device a relatively simple yet effective aligning means for retaining the blades particularly at the instant of cutting in substantilly this aligned position. This is best accomplished as illustrated in the drawings by upstanding support beams or members 19a–b. As can be seen from the drawing, one beam member is presented on either side of the cutting blades 7 and 13. In order to provide the necessary alignment of blade 13 with blade 7, beams 19a and 19b are provided with opposing aligning and guide slots 21a and 21b. As can be seen, particularly with respect to FIG. 2, the ends of blade 13 adjacent to cutting edge 15 reside in slots 21a and 21b and are slideable vertically therewithin. While beams 19a and 19b may be formed in any aligning configuration, for the purposes of simplicity, and as best illustrated in FIG. 4, each of beams 19a and 19b may actually consist of two angle plates 25 bolted or welded to support member 1 and/or stationary blade 7 so as to form therebetween the necessary aligning slots 21a and 21b. Slots 21a and 21b, in this respect, should allow blade 13 to easily slide therewithin, but should not be of such width as to allow blade 13 to get out of alignment, as described above, with blade 7.

In order to manipulate movable blade 13, there is provided a handle means 23, pivotally secured at one of its ends to the rearwardmost upstanding support beam 19b and within guide slot 21b. Handle 23 extends from its pivotal bolt 27 within guide slot 21b across the space defined by the opposing upstanding support beams 19a and 19b and adjacent to the end of blade 13 opposite that of cutting edge 15, and beyond upstanding support beam 19a through slot 21a to a handle extension for operating the device. Within this space defined between opposing upstanding support beams 19a and 19b, there is provided an anvil means generally illustrated at 29 which includes a horizonatal hammer plate 31 and connecting brackets 33 which are rigidly connected to hammer plate 31 and pivotally connected to substantially the center line (the vertical center line) of blade 13 by pivotal means 35 such as a pivotal swing bolt or the like.

The pivotal nature of means 35 is an important feature of this invention, since it has been found that by allowing blade 13 to pivot, blade 13 can more accurately assume the upper surface contour of a slab or stone placed therein thus to make a more accurate cut. This is particularly advantageous where the stone is a substantially flat or rectangular slab, as in most instances of commercial use of stones, so that by allowing blade 13 to pivot about means 35 when brought into engagement with a flat slab stone to be cut (such as illustrated in the drawings by the dotted lines 37) it can substantially assume the same upper surface contour as the slab. As stated, this has been found when used in combination with the blade angle and alignment techniques described above, to provide an extremely accurate cut. For example, in cutting marble window sills of approximately one inch in thickness, marble slivers of approximately one-eighth inch in thickness may be accurately sliced from the stone.

During operation of the device, which operation will be explained more fully hereinafter, it is usually necessary for the operator to place his foot upon some lower portion of the device so as to stabilize it during cutting. This can be simply done by placing the foot upon the upper surface of lower horizontal flange 5b, but in more preferred embodiments an extension of flange 5b is bolted thereto which extends in the same longitudinal direction as handle 23 so as to provide a foot rest, or foot retaining means 39 which extends for a substantial distance in the same longitudinal direction as handle 23. Thus when the operator operates handle 23 he does not have to reach forward to step on the upper surface of flange 5b but may simply use flange 5b's extension 39 which now resides substantially directly under that portion of handles 23 which he is gripping for operating purposes.

OPERATION

The devices of this invention are capable of cutting both soft and hard stones through the simple application of a manually applied hammer blow to the upper surface of hammer plate 31. For purposes of illustration, FIGS. 2, 3 and 5 show a typical marble slab of approximately one inch in thickness presented at its appropriate angle for cutting by placing it between blades 7 and 13. In order to be able to place stone slab 37 between blades 13 and 7, handle means 23 is raised so as to pivot it up-wardly about its pivot 27. Handle 23, in this sense, residing in the chamber 41 defined by the anvil 31, brackets 33, and the adjacent upper edge 43 of blade 13, contacts the lower surface of hammer plate 31 raising blade 13 in its aligning slots 21a and 21b so as to allow slab 37 to be placed between the two blades. In this respect, it can be seen that slab 37 may be placed at any angle both in the vertical and horizontal plane between blades 13 and 7 so as to form any angle of cut, both in width and thickness, desired.

When slab 37 is so located, it is retained by the hand of the operator until handle 23 is lowered, thus moving blade 13 downwardly until cutting edge 15 contacts and retains slab 37 at the precise point at which the cut is desired. The operator, continuing to push downwardly on handle 23 places on or both feet on flange extension 39 so as to stabilize the device for cutting, which is accomplished, at this point, by striking a hammer blow upon the upper surface 31. The force of such a percussion blow is, as seen from the drawings, transmitted downwardly to blade 13 driving blade 13 toward blade 7 and cutting slab 37.

In the usual operation, both portions of the stone merely fall from the device to the ground. In those instances where a very brittle stone may be employed, or there may be a detriment to such a fall, flange 5a may be made large enough so as to constitute a table to catch the stone before it hits the ground. In this respect, flange 5a may be provided with a cushioning member (not shown, for convenience) in those cases where the stone or other building material is particularly fragile and might fracture if allowed to fall even at that low distance.

As can be seen from the above description, the subject invention provides a unique device for cutting both hard and soft stone precisely, with simplicity, and "on the job". The device is portable, and easily liftable by a single operator to the job, and about areas on the hob wherein it is needed. The device itself may be made of the simplest materials, usually iron or iron alloy, but of course other materials may be employed, particularly in regard to cutting edges 9 and 15 so as to achieve the best possible point and precision.

Once given the above disclosure, many other features, modifications and improvements will become apparent to the skilled artisan. Such other features, modifications and improvements are therefore considered to be a part of this invention the scope of which is to be determined by the following claims:

I claim:

1. A portable, manually operated, non-hydraulic cutting device capable of accurately cutting a relatively thin and hard piece of stone comprising a stationary first blade means and a movable second blade means, each of said blade means having a substantially continuous cutting edge defined by two intersecting surfaces, each of said surfaces being inclined at an angle of less than 90° but greater than 0° from the common aligned plane of said cutting edges; guide means slidably retaining said movable second blade means at its lateral ends and aligning said stationary first blade means with said movable second blade means such that the cutting edges of said stationary first blade means and said movable second blade means are retained in substantially the same plane; anvil means located above said movable blade means for receiving a precussion blow and transmitting the force of said blow to the blade means thereby driving said blade means toward each other to cause the cutting of said stone; downwardly extending means connecting said anvil means to said movable blade means by a pivotal connection located at a point intermediate the lateral ends of said movable blade means, said movable blade means being retained in said guide means so as to be capable of substantial pivotal movement about said pivotal connection; and handle means extending between said guide means and extending between said anvil means and said movable blade means for moving said movable second blade means into and out of cutting alignment with said stationary first blade means.

2. A device according to claim 1 wherein said stationary blade means resides upon a support means, and there is a guide means extending upwardly from said support means at each of the two lateral ends of said stationary blade means and wherein said handle means extends between said guide means, pivotally connected at one end to one of said guide means and slidably retainable within the other of said guide means at a point intermediate the ends of said handle means.

3. A device according to claim 2 wherein said anvil means resides above said handle means at a point between said guide means and said handle means in located between said movable blade and said anvil means.

4. A device according to claim 3 wherein said downwardly extending connecting means at a point interior its lateral ends is said pivotal connection with said anvil means and said connecting means includes a downwardly extending plate on either side of said handle means such that there is defined by said anvil means and said connecting means a chamber through which said handle means extend.

* * * * *